United States Patent [19]

Ross, Jr. et al.

[11] Patent Number: 5,015,128

[45] Date of Patent: May 14, 1991

[54] ROTARY DRILL APPARATUS

[76] Inventors: Donald C. Ross, Jr.; Donald C. Ross, Sr., 3706 W. 224th St., Torrance, Calif. 90505

[21] Appl. No.: 498,405

[22] Filed: Mar. 26, 1990

[51] Int. Cl.$^5$ .............................................. B23B 47/34
[52] U.S. Cl. ..................................... 408/59; 175/330; 408/67; 408/204
[58] Field of Search ................... 408/204, 206, 57, 59, 408/56, 68, 67; 175/329, 330, 339

[56] References Cited

U.S. PATENT DOCUMENTS

| | | | |
|---|---|---|---|
| 2,256,092 | 9/1941 | Koebel et al. | 175/330 |
| 2,619,325 | 11/1952 | Arutunoff | 175/330 |
| 2,708,105 | 5/1955 | Williams, Jr. | 175/330 |
| 2,870,993 | 1/1959 | Jahnke | 408/59 |
| 2,996,061 | 8/1961 | Miller | 175/330 |
| 3,033,298 | 5/1962 | Johnson | 408/59 |
| 4,662,802 | 5/1987 | Osterman | 408/56 |

*Primary Examiner*—William Briggs
*Attorney, Agent, or Firm*—Roger A. Marrs

[57] ABSTRACT

Rotary drill apparatus is disclosed herein which is secured to a turning shaft by an adapter plate. A cylindrical core drill body downwardly depends from the plate to terminate in a plurality of cutting teeth capable of cutting an annular groove to define a core intended to be pulverized. An internal drill bit is carried on the plate in coaxial spaced relationship with respect to the circular arrangement of teeth for forcibly engaging the defined core so as to grind and powderize the core within the core drill body. A circulating coolant system carries the ground and powderized core away from the drill leaving no core chunks or residue.

3 Claims, 1 Drawing Sheet

U.S. Patent
May 14, 1991
5,015,128
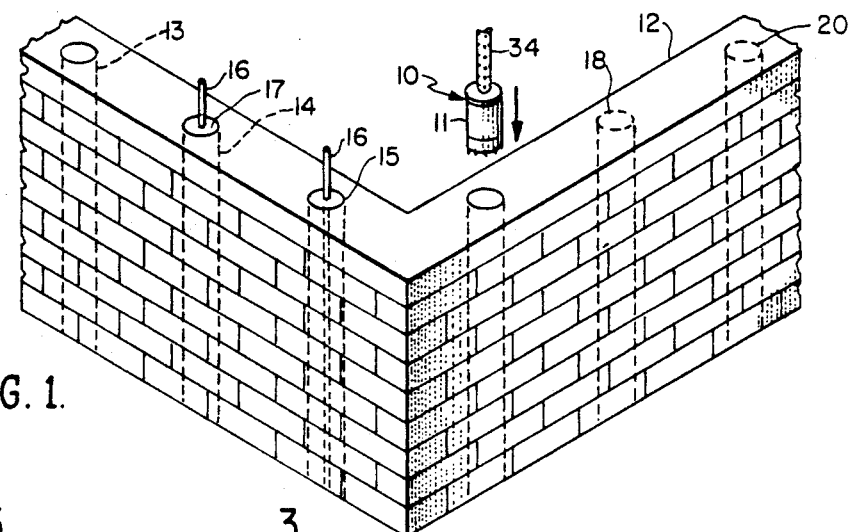
FIG. 1.
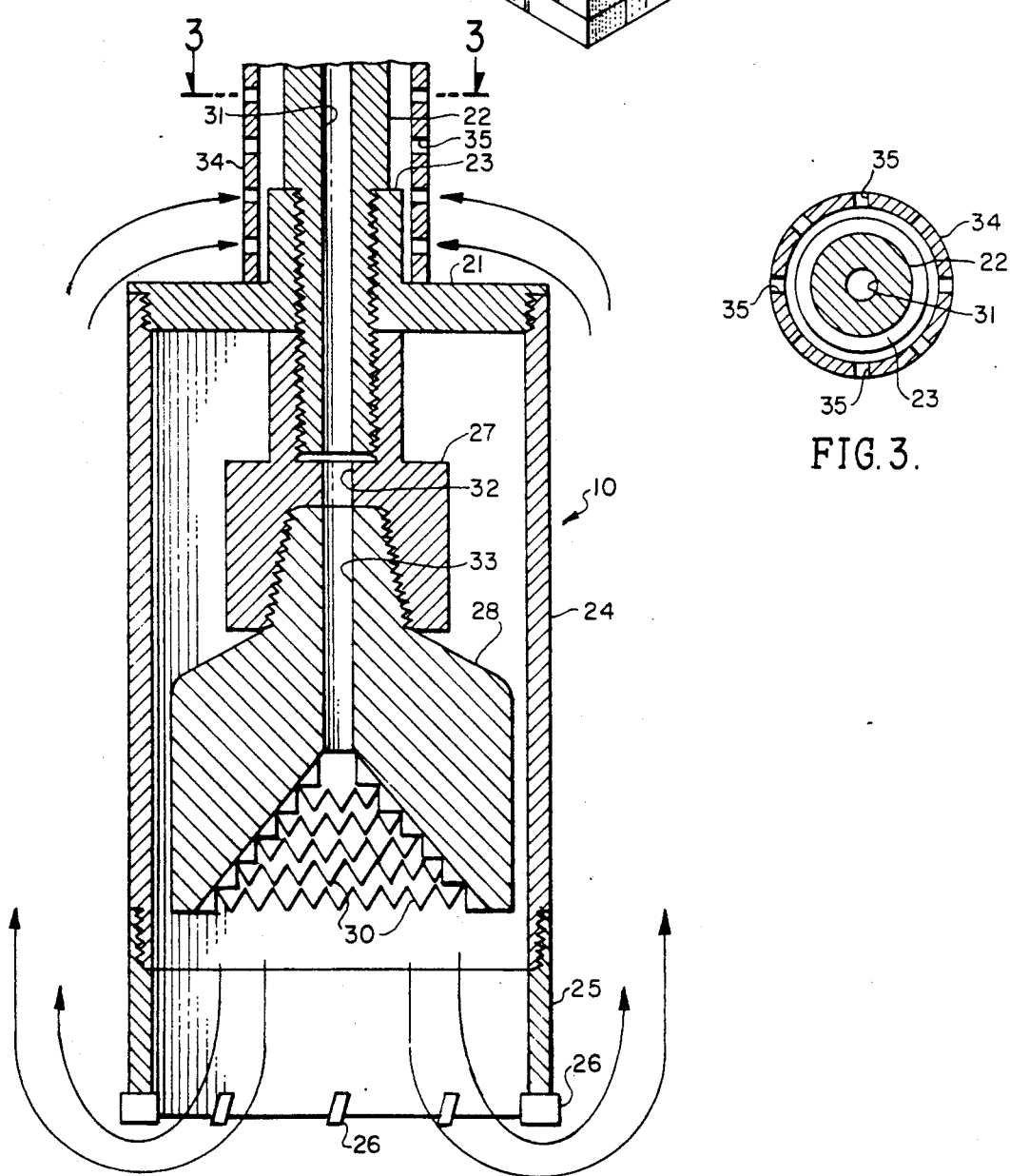
FIG. 2.
FIG. 3.

ROTARY DRILL APPARATUS

BACKGROUND OF THE INVENTION

1. Field of the Invention

The present invention relates to the field of drilling and more particularly to a novel rotary drill having an internal drill bit surrounded by a circular cutter so that the core is pulverized and powderized for removal via a fluid circulation system.

2. Brief Description of the Prior Art

It is the current practice to reinforce existing walls of buildings by drilling a hole from the top of the wall through its height and into the foundation so that a reinforcing rod can subsequently be installed within the hole or bore, followed by retention of the rod to the existing wall construction by a suitable cement, pliable plastic or the like. In the performance of drilling, it is customary to use a circular drill so that a solid core is defined for a prescribed length. Subsequently, the drill is removed so that access can be had to the defined core which is removed as a solid piece. For extremely long holes, the procedure is repeated many times so that the resultant hole is well defined and clear of core fragments or debris. Oftentimes, the core is chopped in an independent procedure, followed by removal in pieces or the like.

Obviously, problems and difficulties are encountered when using such a conventional practice, which stem largely from the fact that repetitive drilling and core or core part removal operations are required in order to prepare the wall with a clear hole for receiving the reinforcing rod and retaining material. Inasmuch as the circular cutting of the core is initially required, followed by later removal of the core with separate equipment, this necessitates a time-consuming and multi-equipment procedure. The core formation and its ultimate removal are done in separate operations employing separate equipment.

Therefore, a long-standing need has existed to provide an economic means for providing a hole in an existing wall or formation which not only defines a core during the drilling operation but simultaneously pulverizes the core and evacuates the material of the core without the necessity of multiple drilling and core-removing steps or procedures. Such a means should be operable simultaneously by the same power equipment and should require a single drilling and pulverizing operation.

SUMMARY OF THE INVENTION

Accordingly, the above problems and difficulties are obviated by the present invention which provides a navel rotary drilling apparatus including an adapter plate secured to a turning shaft and carrying a cylindrical core drill body downwardly depending therefrom which terminates in a plurality of carbide teeth arranged in a continuous circle so as to cut an annular groove defining a core intended to be removed An internal drill bit is carried from the adapter plate in coaxial spaced relationship with respect to the circular arrangement of the carbide teeth and which lies along the central longitudinal axis of the core so as to impact against the core to effect pulverization and powderization of the core material An air system, including a vented tube surrounding the turning shaft in spaced relationship, is provided for carrying the powderized core material from within the cylindrical core drill body and from within the resultant hole or bore having been drilled. The powderized core debris is carried externally of the core drill body and evacuated via the vented tube to clear the bore or hole.

Therefore, it is among the primary objects of the present invention to provide a novel drilling apparatus for not only cutting a core but in providing a means for simultaneously removing the core during the drilling operation.

Another object of the present invention is to provide a novel rotary drill apparatus for cutting an elongated bore or hole in an existing wall of a construction whereby the cut material is immediately and simultaneously evacuated during the drilling procedure.

Another object of the present invention is to provide a novel rotary cutter having a cylindrical cutting means surrounding a drill bit so that an initial core is established during the drilling procedure immediately followed by pulverization and powderization of the core by the drill bit so that a bore or hole is defined in a single cutting operation without the presence of residue or debris.

Yet another object of the present invention is to provide a novel inexpensive and time-saving means for cutting a hole in a structure and evacuating the residue and debris material simultaneously so that time and equipment are saved during the entire procedure.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a perspective view of an existing wall of a building or construction having a plurality of holes or bores provided therein employing the inventive rotary drill apparatus of the present invention;

FIG. 2 is an enlarged longitudinal cross-sectional view of the rotary drill apparatus incorporating the present invention; and FIG. 3 is a transverse cross-sectional view of the rotary drill apparatus shown in FIG. 2 as taken in the direction of arrows 3—3 thereof.

DESCRIPTION OF THE PREFERRED EMBODIMENT

Referring to FIG. 1, the novel rotary drill of the present invention is illustrated in the general direction of arrow 10 which includes a drill head 11 employed to forcibly pass through a wall of a dwelling, such as a wall 12. It is intended to provide a hole or bore through the entire height of the wall so that reinforcement elements can be introduced and secured thereto. As an example, previously drilled holes are indicated by numerals 13, 14 and 15, into which reinforcing rods, such as rod 16, have been placed and secured in position by means of a plastic-like material, cement, concrete or the like, indicated by numeral 17. The rotary drill apparatus 10 is illustrated in position preparatory for drilling a hole in the wall 12 with additional holes to be drilled at locations indicated by numerals 18 and 20 respectively Referring now in detail to FIG. 2, the rotary drill apparatus then is primarily composed of an adapter plate 21 carried on the end of a turning or drive rod 22. A collar or boss 23 carried on the top surface of plate 21 strengthens the coupling which is of a threaded arrangement between the end of the driveshaft 22 and the adapter plate 21. Downwardly depending from the periphery of the adapter plate is a cylindrical core drill body 24 which terminates at its free end in a threaded connection with a tooth collar 25 constituting a core drill bit The end of the drill bit from its end threadably coupled to the core drill body carries a plurality of teeth, such as indicated by numeral 26 which may be of sufficient hardened material so as to cut through wall construction. In some instances, teeth composed of carbide may be used, while in other instances, diamond or other cutting materials can be employed.

Coaxially disposed within the interior of the core drill body and threadably coupled to the end of the driveshaft 22, there is provided a drill adapter 27 which carries, in downwardly depending relationship, an internal drill bit 28. The opposite end of the bit 28 from its end secured to the drill adapter 27 is provided with multiple rows and columns of cutting elements broadly indicated by the numeral 30. It is to be particularly noted that the drill bit 28 is coaxially disposed with respect to the surrounding cylindrical core drill body 24 and its respective circular arrangement of cutting teeth 26 and that the relationship is further established in that the cutting elements 30 are in fixed spaced relationship with respect to the core drill body and the teeth 26. A feature of the invention resides in the fact that the cutting elements 30 carried on the drill bit 28 are immediately behind the cutting teeth 26 so that engagement of the cutting elements 30 with wall material will not take place until after a circular or annular groove has been established by the cutting teeth 26. However, once the annular groove has been provided and the core drill body forcibly urged further into the wall construction, both the cutting teeth 26 and the teeth elements 30 will cut the wall material simultaneously. Therefore, it can be seen that the circular arrangement of cutting teeth 26 provides a circular or annular groove which defines a core that is subsequently engaged by the bit teeth or elements 30 so that the defined core is pulverized and powderized during the coring operation or procedure. The resultant residue is in the form of dust, fine particles, granular substance and powderized wall material.

An evacuation system is included in the present invention for removal of the dust residue which includes an open passageway 31 in the driveshaft 22 which is coextensive with passageways 32 and 33 through the drill adapter 27 and drill bit 28 so that its open end is adjacent to the bit cutting elements 30. Pressurized coolant taking the form of a liquid, such as water or oil, or taking the form of air or other coolant medium is conducted through the coextensive passageway 31 for discharge into the interior of the core drill body 24 where the residue of the core is forced from the drill body 24 externally around its outer surface within the previously drilled hole. The plurality of arrows show the conduction of the coolant, including the residue material which is forcibly urged from the interior of the core drill body and exteriorly carried beyond the body to an exhaust tube 34 carried on the top of the adapter plate 21 and coaxially disposed with respect to the turning or driveshaft 22. The exhaust tube includes a plurality of vents or openings 35 through which the coolant carrying the core residue passes into the interior of the tube and around the drive or turning shaft 22. A pressurized evacuation can occur in the passageway between the opposing wall surfaces of the tube 34 and the driveshaft 22 so that a continuous evacuation is assured.

FIG. 3 clearly illustrates the evacuation passageway between the tube 34 and the driveshaft 22, and further illustrates the plurality of vents 35 which are provided in the tube 34.

Therefore, in view of the foregoing, it can be seen that a rotary drill apparatus is provided which simultaneously cuts an annular groove so as to define a solid core in a wall construction which is then pulverized and reduced to a dust or powder so that the resultant residue can be mixed with a pressurized coolant for evacuation. Such an apparatus permits a single drilling operation to achieve the providing of a hole or bore through a construction material. The drilling can occur on any plane, whether it be vertical, horizontal or angular, since the annular cutting teeth and the pulverizing cutting elements are carried on the same body and are coaxially disposed in spaced relationship with respect to each other. The result is an economic savings in time, equipment and convenience.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A rotary drill apparatus comprising:
   a first circular cutting device rotatably driven to define a solid core intended to be removed to establish a hole or bore;
   a second cutting device coaxially disposed with respect to said first cutting device in spaced-apart relationship;
   a cylindrical hollow body operably supporting said first and second cutting devices so as to operate simultaneously to cut said core and pulverize said core;
   evacuation means including a coolant providing means operably disposed with said cutters and said body to forcibly carry and remove residue of said cut and pulverized core away from said hole or bore;
   said evacuation system includes means associated with said second cutting device for conducting coolant from said providing means in mixing relationship with said core residue and further including means associated with said body for forcibly withdrawing said coolant mixed with said core residue externally of said body and said cutting devices.

2. The invention as defined in claim 1 including:
   drive means secured to said body for rotating said body effecting cutting by said first cutting device;
   said second cutting device being driven in unison with said first cutting device.

3. The invention as defined in claim 2 wherein:
   said body is an elongated cylinder downwardly depending from an adapted plate;
   said driver means is a turning shaft having its end secured to said body and said second cutting device with said second cutting device encircled by said cylindrical body; and
   said first cutting device carried on open end of said body defining an opening leading into the interior of said body.

* * * * *